Figure 1:
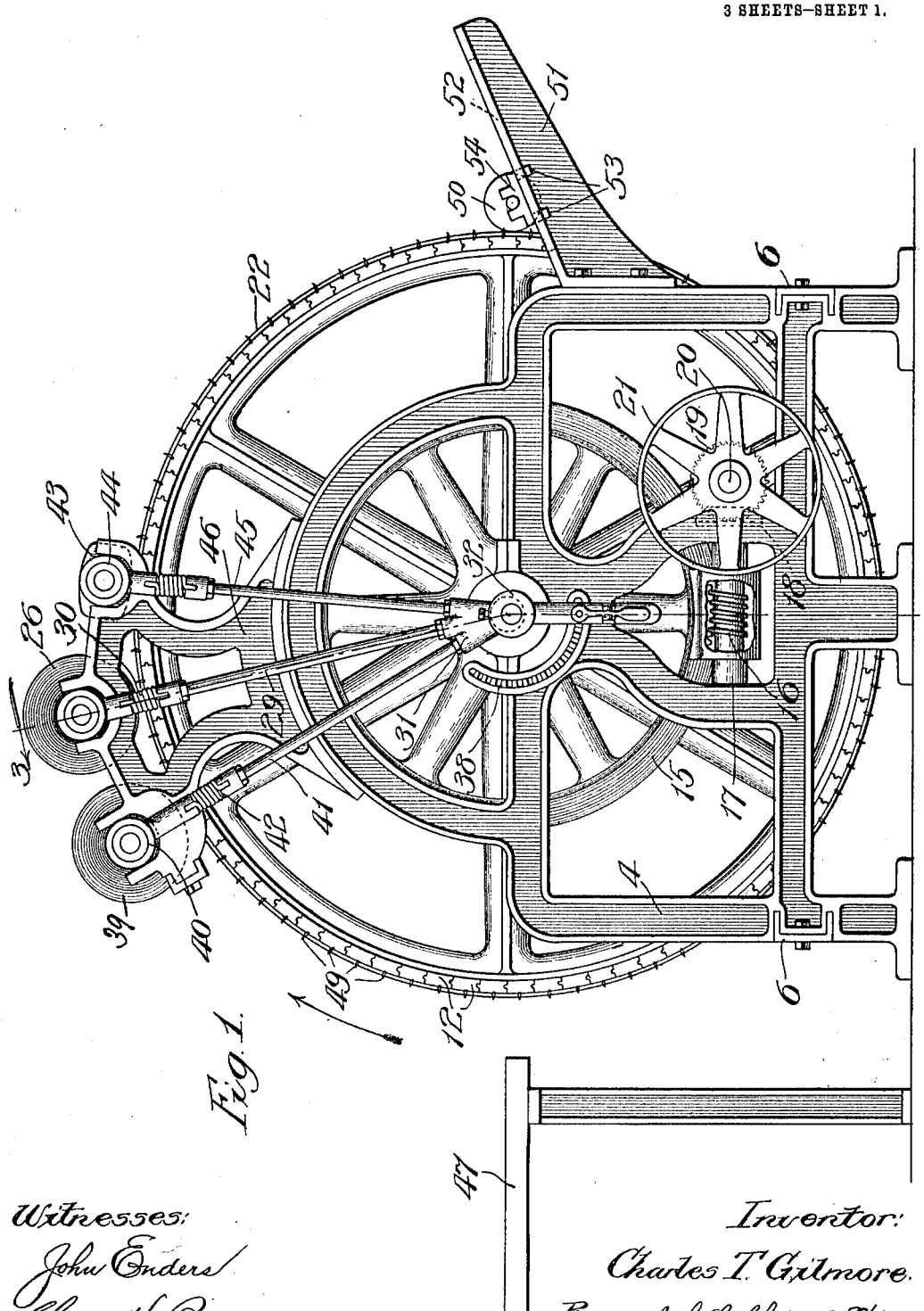

C. T. GILMORE.
IRONING MACHINE.
APPLICATION FILED JULY 12, 1909.

1,001,384.

Patented Aug. 22, 1911.
3 SHEETS—SHEET 1.

Witnesses:
John Enders
Chas. H. Buell

Inventor:
Charles T. Gilmore
By Spenforth, Lee, Chritton & Wiles
Attys.

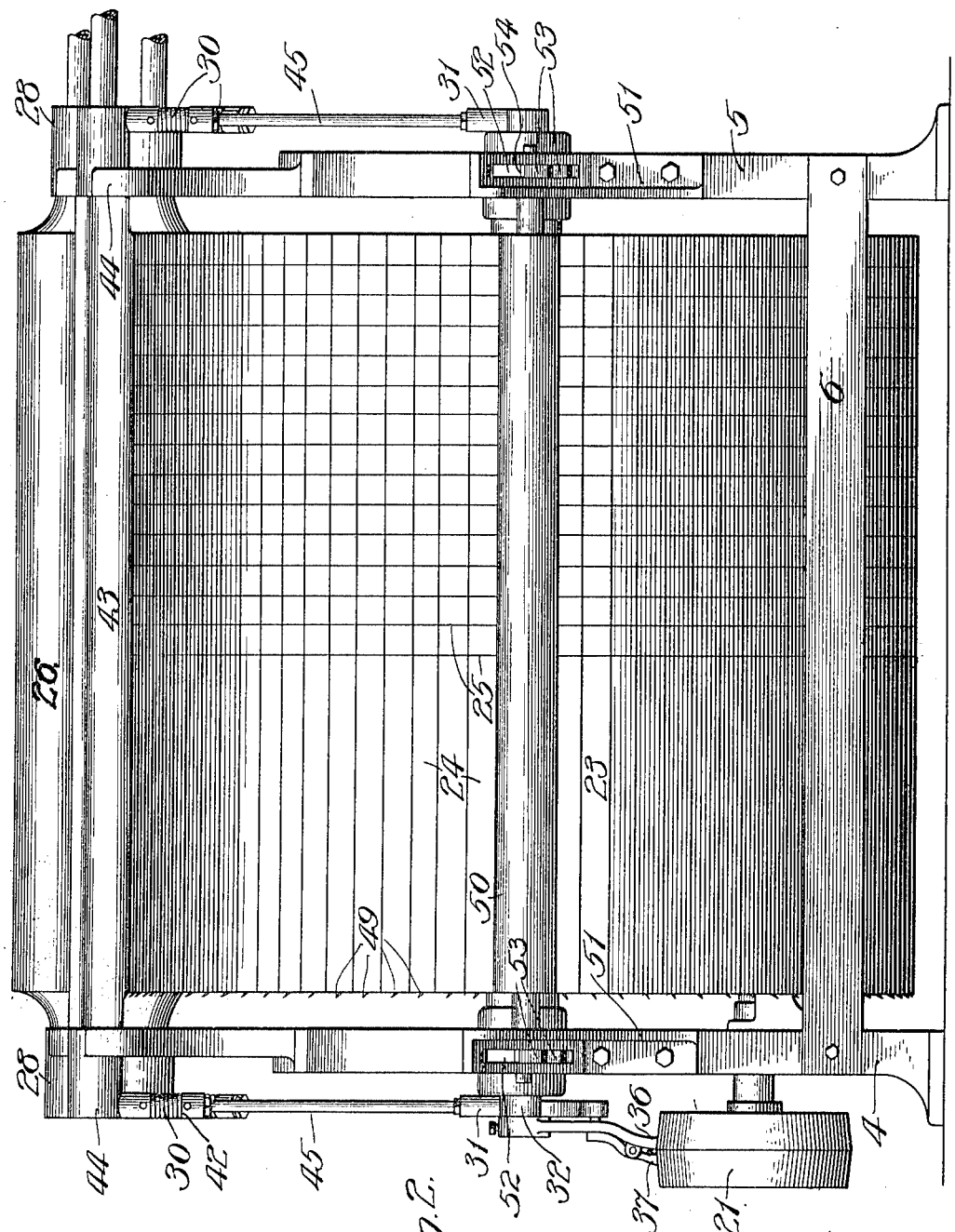

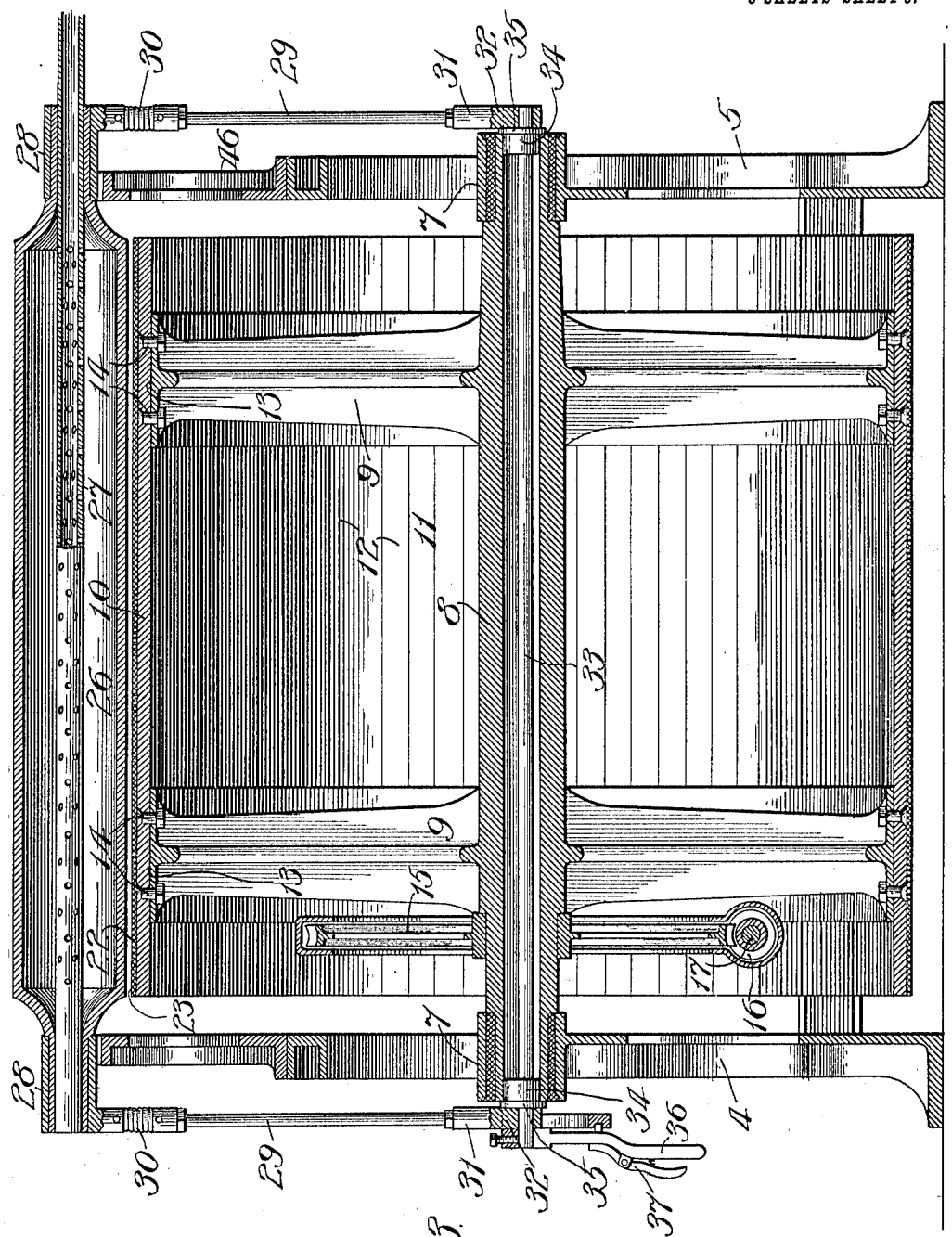

UNITED STATES PATENT OFFICE.

CHARLES T. GILMORE, OF CHICAGO, ILLINOIS.

IRONING-MACHINE.

1,001,384.  Specification of Letters Patent.  Patented Aug. 22, 1911.

Application filed July 12, 1909. Serial No. 507,084.

*To all whom it may concern:*

Be it known that I, CHARLES T. GILMORE, a citizen of the United States, residing at Chicago, in the county of Cook and State of Illinois, have invented a new and useful Improvement in Ironing-Machines, of which the following is a specification.

My invention relates to machines for ironing fabrics as the final step in the laundrying process, and my general object is to provide a machine of the character above referred to which will be capable of ironing, in a satisfactory way, not only articles such as towels, handkerchiefs and other relatively small articles, but relatively large pieces, as, for example, lace curtains.

My more particular object is, however, to facilitate the laundrying of large pieces, and more particularly lace curtains, to the end of expediting the laundrying operation, whereby the use of racks for drying the pieces may be dispensed with.

Referring to the accompanying drawings—Figure 1 is a view in end elevation of a machine constructed in accordance with my invention. Fig. 2 is a view in side elevation of the machine, the machine being viewed in this figure from the right in Fig. 1; and Fig. 3, a section taken at the line 3 on Fig. 1 and viewed in the direction of the arrow.

The frame of the machine comprises two similar side members 4 and 5 united by two channel irons 6, 6 as represented. Journaled in bearings 7, 7 in the opposite ends of the frame thus provided is a hollow shaft 8 carrying two wheels 9 formed integrally therewith and spaced apart from each other. These wheels form a support for the circumferential shell 10 of a drum 11, the shell 10 being formed of interlocking longitudinally extending wooden staves 12 which are secured flatwise to the peripheries 13 of the wheels as by countersunk bolts 14, the drum thus formed being provided for the purpose of supporting and carrying the pieces of fabric to be ironed, beneath the ironing mechanism.

The drum is adapted to be rotated continuously in the same direction, and as means for rotating it I preferably provide the following described mechanism: A wormwheel 15 is secured on the shaft 8 between the frame-sides 4 and 5 and meshes with a worm 16 housed as represented and carried by a shaft 17 journaled in the frame. The shaft 17 carries a miter-gear 18 on one end which meshes with a similar gear 19 on the adjacent end of the operating shaft 20, which latter is similarly journaled in the frame end and is equipped with a belt-pulley 21 for connection with the driving power (not shown).

The periphery of the drum is covered with a layer 22 of felt, and superposed on this layer is a covering 23 of fabric, preferably duck which contains on its exposed surface throughout its extent a series of parallel longitudinally extending lines 24, and a series of circumferentially parallel lines 25 disposed at right angles to the lines 24 for a purpose hereinafter disclosed.

The main ironing roller is represented at 26. It is heated in any suitable way, as by steam or by the ordinary gas-heating means represented at 27, and is journaled at its ends in bearings 28 formed on the upper ends of similar rods 29, each containing a spring-section 30 and connected at its lower end with a boss 31 extending upwardly from an annular head 32. The heads 32 loosely surround the opposite projecting ends of a rock-shaft 33 extending eccentrically through the hollow shaft 8, in the ends of which it is fastened in similar eccentric collars 34 journaled in the ends of the shaft 8 and provided with flanges 35 to prevent longitudinal movement of the eccentric rock-shaft. On one end of the shaft 33 is provided an operating handle 36 equipped with a spring-pawl 37 to engage with an adjacent segmental rack 38 provided on the frame-member 4. An ironing roller 39, heated like the roller 26, is journaled at its ends in bearings 40 formed on the upper ends of rods 41, like the rods 29, and containing spring-sections 42, the lower ends of the rods 41 being connected with the bosses 31 on the heads 32, as represented of one of the rods 41 in Fig. 1. At the side of the main roller 26, opposite to that at which the roller 39 extends across the cylinder, is provided a hollow polishing shoe 43 heated like the rollers 26 and 39. This shoe is supported at its ends in bearings 44 formed on the upper ends of rods 45, in all respects like the rods 41, and connected with the bosses 31 on the heads 32. Similar supplemental rigid frame-sections 46 rise in slightly slanting position from the frame-sections 4 and 5, as shown, and form guides for the ends of the ironing rollers and polishing shoe in their slight up and down movements.

With the drum slowly rotating continuously in the direction indicated by the arrow in Fig. 1 under the driving action of the described worm-wheel 15, an attendant, standing at one end of the drum 11, when curtains are to be ironed, removes a curtain, while in damp condition, from a table 47 and thereupon hooks the curtain at one of its scalloped edges over the protruding ends of pins 49 projecting from the shell 10 of the drum beyond its periphery near one end. Another operator grasps the free portion of the curtain and brushes it down upon the surface of the shell 10 with an ordinary brush or his hand, and in doing so adjusts the upper edge of the curtain to a position in which it parallels the lines 24, and as the cylinder continues to rotate the first referred-to operator continues to apply the curtain to the pins, as stated, while the other brushes the curtain flat upon the shell 10 to cause its edges to parallel the lines 24 and 25 respectively. The curtain thus applied to the drum then passes under the ironing rollers, which are rotated by contact with the shell 10, and then under the shoe by which it is ironed and polished. The curtain is then ready to be removed from the cylinder, the operator lifting that end of the ironed curtain which first passed under the rollers and applying it to a roller 50 upon which it is rolled.

The details of the roller 50 and its supporting means are as follows: The frame of the machine carries two spaced brackets 51, the upper surfaces of which incline upwardly in a direction away from the main frame and contain longitudinally extending slots 52 into which lugs 53 depending from boxes 54 fitting against the upper surfaces of the brackets, extend to guide the boxes in their movement hereinafter described longitudinally of the brackets, each of the boxes 54 serving as a bearing for the reduced ends of the roller 50. The upper surfaces of the brackets are so inclined as to cause the roller 50 to normally bear against the periphery of the drum 11 and be driven by frictional contact therewith. As the curtain rolls upon the roller 50, thereby increasing at each revolution of the latter the diameter of the cylindrical body formed by the roller 50 and curtain rolled thereon, the roller and boxes 54 will be forced slowly upward against gravity along the inclined surfaces of the brackets, the force of gravity holding the rolled portion of the curtain in frictional contact with the curtain on the drum and thus the curtain is rolled up on the roller 50 at the same speed as that at which it passes under the ironing rollers, with the manifest advantage of preventing strains upon the curtain tending to impair it. Thus after a curtain has been rolled upon the roller 50, the latter can be lifted out of the boxes 54, whereupon the curtain, or curtains if more than one, is wound in superposed condition onto the roller 50 may be slipped lengthwise off the roller in rolled condition, and, if desired, a tube of suitable dimensions and formed of any suitable light-weight material may be inserted into the curtain-roll for preventing the curtain or curtains from becoming mussed in delivery.

While my invention has special reference to ironing curtains, it will be understood that any other pieces may be ironed on the machine, the lines provided on the surface of the shell 10 serving as a guide for applying the pieces to be ironed to the drum to cause them to be ironed straight.

The feature of providing the spring-sections in the rods 29, 41 and 45 affords to the rollers and polishing shoe a certain desired resiliency, the benefits of which are well known in the art; and the eccentric connection afforded between the shaft 33 and shaft 8 and the connecting means between the shaft 33 and the ironing rollers and polishing shoe permit the ironing devices to be raised out of operative position when the machine is at rest.

It will be noted from the foregoing that the curtains and other pieces ironed by this machine are ironed to the desired condition, and that curtains so ironed have their adjacent edges at right angles to each other, which causes them to hang perfectly straight when applied to windows.

As far as I am aware, I am the first to provide a machine which will insure the finishing of curtains in desired straightened condition, whereby the use of curtain-drying racks or stretchers may be dispensed with. Furthermore, by winding curtains upon a cylinder, the danger of stretching the curtains to such extent as to break the fine threads of which they are made is obviated, this being one of the serious objections to curtain-stretchers, as in the use of such devices the curtains are required to be stretched.

I prefer to form the shell of the drum of wood and cover it with felt as illustrated and described, as wood is a poor conductor of heat and tends to maintain the drum in relatively cool condition, whereby danger of injury to the fabrics being ironed is minimized.

While I have illustrated and described my invention as embodied in a machine in which two ironing rollers and one shoe are employed, I do not wish to limit it to such specific arrangement, as the number of rollers and shoes may be varied to suit different conditions. Furthermore, under some conditions it may be desirable not to use the shoe, in which case it may be omitted.

What I claim as new, and desire to secure by Letters Patent, is—

1. An ironing-machine comprising, in combination, a suitably-supported rotatable drum having on its periphery a series of parallel longitudinally-extending lines serving as guides for work applied to the drum, means on the drum near one end for engaging with an edge of work to be ironed by said machine, and ironing means supported on the machine to extend across the drum and into the path of work applied thereto.

2. An ironing machine comprising, in combination, a suitably-supported rotatable drum, having on its periphery a series of parallel longitudinally-extending lines and a second series of parallel circumferentially-extending lines disposed at right angles to said first-named series and serving as guides for work applied to the drum, a series of fastening devices arranged at the periphery of said drum near one end for engaging with an edge of work to be ironed by said machine, and ironing means supported on the machine to extend across the drum and into the path of work applied thereto.

CHARLES T. GILMORE.

In presence of—
W. B. DAVIES,
R. A. SCHAEFER.

---

Copies of this patent may be obtained for five cents each, by addressing the "Commissioner of Patents, Washington, D. C."